UNITED STATES PATENT OFFICE.

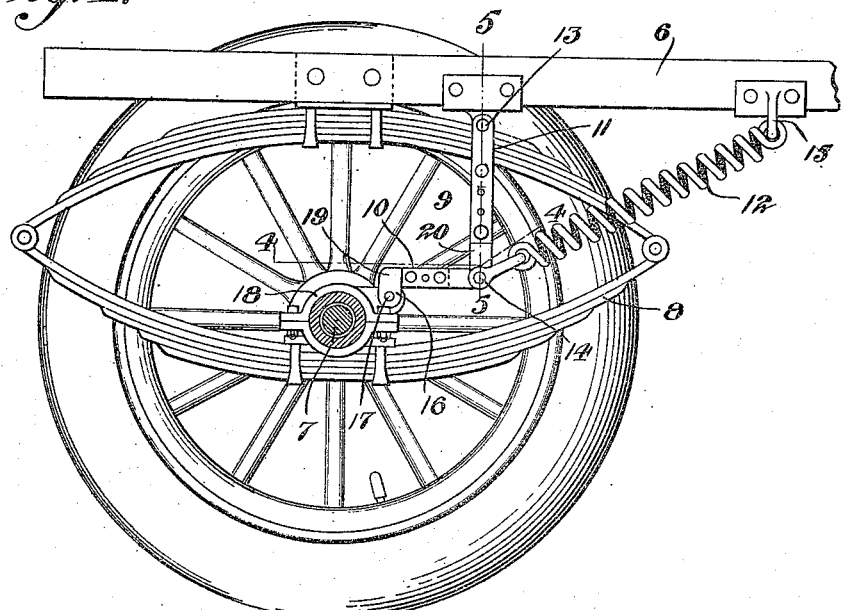
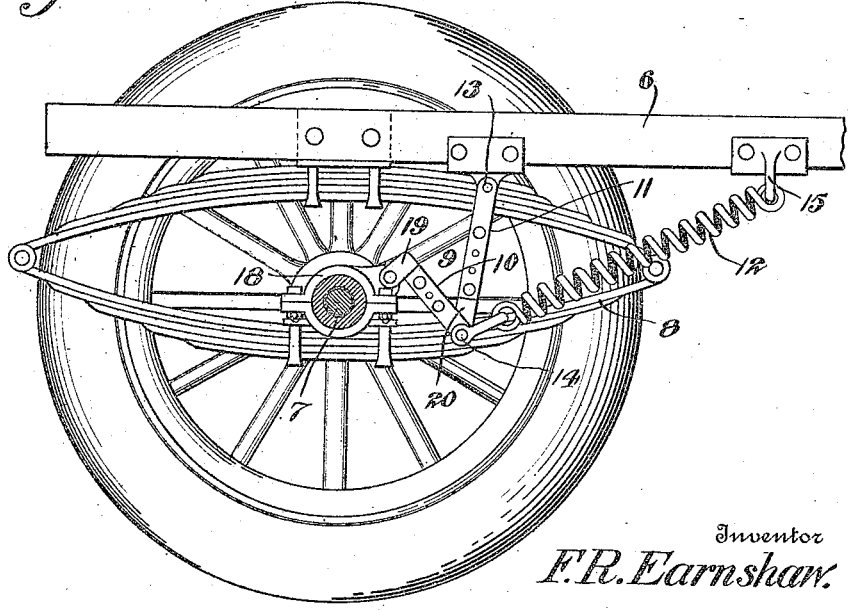

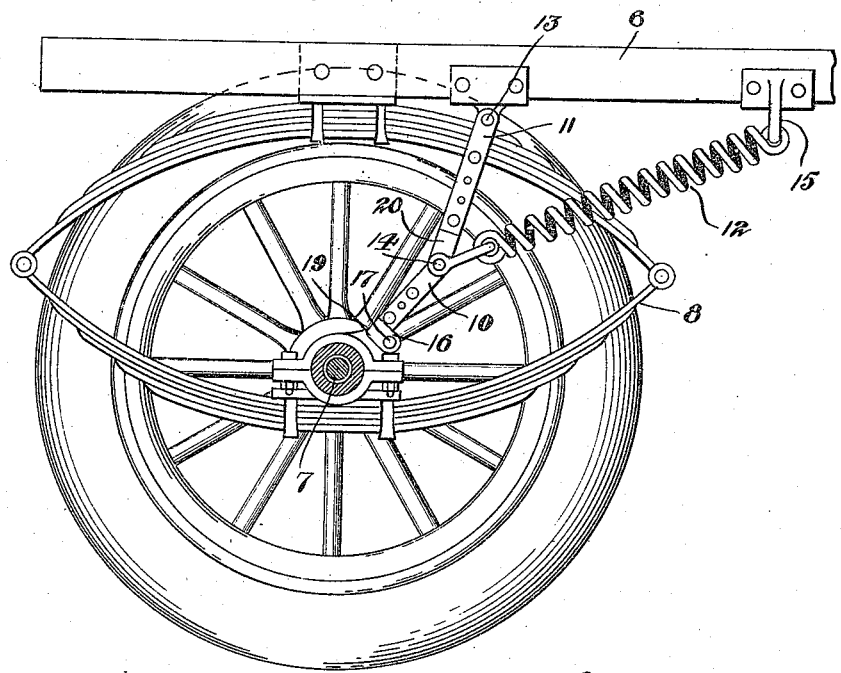
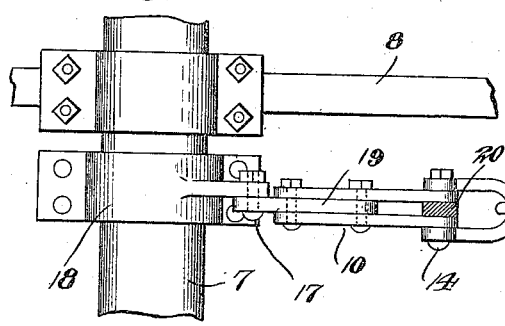
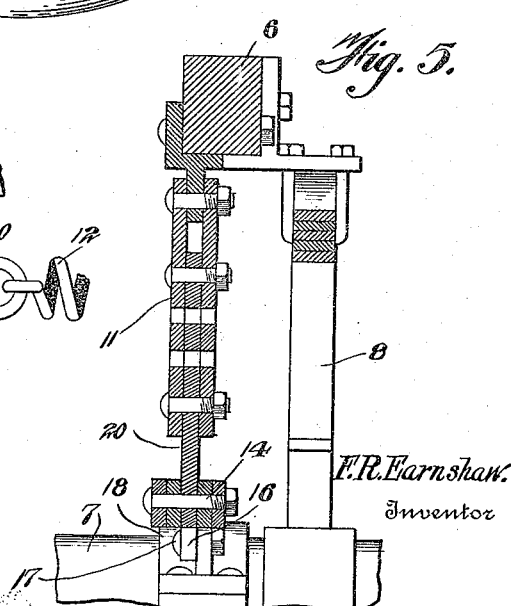

FRANK R. EARNSHAW, OF LAKE BEULAH, WISCONSIN.

SHOCK-ABSORBER.

1,296,375.  Specification of Letters Patent.  Patented Mar. 4, 1919.

Application filed July 11, 1916. Serial No. 108,677.

*To all whom it may concern:*

Be it known that I, FRANK R. EARNSHAW, a citizen of the United States, residing at Lake Beulah, in the county of Walworth and State of Wisconsin, have invented new and useful Improvements in Shock-Absorbers, of which the following is a specification.

This invention relates to shock absorbers for vehicles and more especially for automobiles, and the primary object of the invention is to produce a simple and effective device of this character which is adapted to operate in conjunction with the vehicle springs, to serve to prevent excessive vibration of the springs and to check the recovery of the same after being subjected to undue strain or pressure incident to the wheel traveling over rough roads or incident to an excessive weight being imposed upon the body of the vehicle.

With the above and other objects in view the improvement resides in the construction, combination and arrangement of parts set forth in the following specification and falling within the scope of the appended claim.

In the drawings:

Figure 1 is a side elevation illustrating the application of my improvement,

Fig. 2 is a similar view illustrating the arrangement of parts when an excessive weight has been placed on the body of the vehicle or when the springs of the vehicle have been subjected to undue pressure incident to the wheels of the vehicle contacting with obstructions in the road, Fig. 3 is a similar view illustrating the arrangement of parts when the springs of the vehicle are subjected to undue expansion by the rebound of the vehicle after passing over an obstruction, Fig. 4 is an enlarged horizontal sectional view approximately on the line 4—4 of Fig. 1, and Fig. 5 is a similar enlarged sectional view approximately on the line 5—5 of Fig. 1.

In the drawings, 6 designates the frame or body of the vehicle, 7 one of the axles carrying the usual traction-wheels, and 8 one of the springs mounted upon the said axles and supporting the vehicle body.

The shock absorber is broadly indicated by the numeral 9 and includes link members 10 and 11, and a spring 12. The link member 11 has its upper end pivotally secured to the frame of the vehicle, as at 13, and its opposite end pivotally connected to the link 10, as indicated by the numeral 14, while the spring 12 is arranged angularly of the link members 10 and 11 and has one of its end convolutions secured to the pivot 14 and its opposite end secured, as at 15, to the vehicle body or frame. The link 10 has its free end arranged angularly, as at 16, and this said angular portion is pivotally connected, as at 17, to a strap or band 18 that surrounds the axle 7. The shock absorber is disposed to one side of the axle, as clearly illustrated in the drawings, and the spring 12 is of sufficient strength to normally sustain the links 10 and 11 at a right angle to each other and also exert a sufficient pull or tension as to maintain the axle 7 in proper spaced relation to the vehicle body 6 without inflicting strain upon the springs 8. Should the spring of the vehicle be subjected to undue strain, as for instance, by the weight of the load thereon or by the wheels contacting with an obstruction the link 10 will swing upon the link 11 in an upward direction causing both of the links to assume an angle with relation to each other, thus exerting a pull upon the spring 12 causing the same to exert a tension in a direction to return the parts to their initial position. Upon the elliptical spring 8 being subjected to undue expansion, as illustrated in Fig. 3 of the drawings, the straight portion of the links 10 and 11 will be arranged almost in parallel relation with each other, the spring 12 being expanded and having a tendency to swing the angularly disposed links to bring the link 11 to a substantially vertical position and the link 10 to a substantially horizontal position or to return the parts to their initial or normal position, as illustrated in Fig. 1.

Both of the links 10 and 11 comprise adjustable elements, the link 10 comprising two spaced outer members having an intermediate or telescopic member, the last mentioned member, for distinction, being indicated by the numeral 19, and the intermediate member 19 may be adjustably secured to the side members in any preferred manner. Likewise the link member 11 preferably comprises side members having an intermediate member indicated, for distinction, by the numeral 20, and this member 20 may be secured in a longitudinally adjusted position with relation to the side members of the link in any desired or preferred manner.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a device for the purpose set forth, the combination with a vehicle including the frame thereof, a suspension spring carried thereby and a wheel carrying an axle supported on said suspension spring; of a band having an ear thereon secured on the axle, a link pivotally connected to the ear of the band and comprising a central member and side members adjustably connected to said central member and to each other, a second link pivotally secured to the frame to one side of the axle, said second link also comprising an intermediate and side members, adjustable means for connecting said members, the side members of the first mentioned link receiving therebetween the central member of the last mentioned link, a pivot passing through the ends of said links, a yoke secured on the pivot, and an angularly disposed helical spring connected with said yoke and to the frame of the vehicle whereby to normally hold said links at a right angle with respect to each other.

In testimony whereof I affix my signature.

FRANK R. EARNSHAW.

Copies of this patent may be obtained for five cents each, by addressing the "Commissioner of Patents Washington, D. C."